(12) United States Patent
Bizily et al.

(10) Patent No.: US 8,050,784 B2
(45) Date of Patent: Nov. 1, 2011

(54) INTEGRATED PROGRAMMER REFERENCE FOR INDUSTRIAL CONTROL DEVICE DATA

(75) Inventors: James A. Bizily, Willoughby, OH (US); Scott A. Pierce, Concord Township, OH (US); Patrick D. Telljohann, Solon, OH (US); Robert D. Law, Independence, OH (US); Dennis M. Wylie, Jr., Mentor, OH (US); Paul T. Griesmer, Broadview Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 136 days.

(21) Appl. No.: 12/093,764

(22) PCT Filed: Nov. 15, 2006

(86) PCT No.: PCT/US2006/044331
§ 371 (c)(1),
(2), (4) Date: May 15, 2008

(87) PCT Pub. No.: WO2007/059205
PCT Pub. Date: May 24, 2007

(65) Prior Publication Data
US 2008/0300695 A1    Dec. 4, 2008

Related U.S. Application Data

(60) Provisional application No. 60/736,701, filed on Nov. 15, 2005, provisional application No. 60/737,438, filed on Nov. 16, 2005.

(51) Int. Cl.
*G06F 19/00* (2006.01)
*G01B 3/44* (2006.01)
*G01B 5/28* (2006.01)

(52) U.S. Cl. ............ 700/97; 700/95; 700/100; 700/117; 700/121; 702/34; 702/35

(58) Field of Classification Search ............... 700/1, 19, 700/95, 97, 100, 117, 121; 716/19; 702/34, 702/35
See application file for complete search history.

(56) References Cited

U.S. PATENT DOCUMENTS

| 4,533,997 | A  | * | 8/1985 | Furgerson ........................ 703/21 |
|---|---|---|---|---|
| 4,771,374 | A  | * | 9/1988 | Ropelato ........................... 700/1 |
| 5,408,603 | A  | * | 4/1995 | Van de Lavoir et al. ...... 715/763 |
| 6,108,662 | A  | * | 8/2000 | Hoskins et al. ............... 707/102 |
| 6,192,282 | B1 | * | 2/2001 | Smith et al. ..................... 700/19 |
| 6,618,856 | B2 | * | 9/2003 | Coburn et al. ................ 717/135 |
| 6,854,111 | B1 |   | 2/2005 | Havner et al. |
| 6,889,141 | B2 | * | 5/2005 | Li et al. ............................ 702/2 |

(Continued)

OTHER PUBLICATIONS

Wainwright et al., "Auditing System Flexibility in the Context of Manufacturing Strategy Information", 1997, Logistics Information Management, 168-177.*

(Continued)

*Primary Examiner* — Ramesh B Patel
*Assistant Examiner* — Thomas Stevens
(74) *Attorney, Agent, or Firm* — Boyle Fredrickson LLP; R. Scott Speroff; John M. Miller

(57) ABSTRACT

A computer program to assist in programming an industrial control system provides a programmer with a functional description of the data of low-level devices in the industrial controller, as gleaned from electronic data sheets, whose data is extracted and combined with mapping data used during the configuration of the industrial controller. The functional description may be used to create a reference for the programmer that may be incorporated into the control program source file.

18 Claims, 2 Drawing Sheets

U.S. PATENT DOCUMENTS

| | | | |
|---|---|---|---|
| 7,099,890 B2* | 8/2006 | Cahill et al. | 1/1 |
| 7,197,696 B1* | 3/2007 | Muzumdar | 715/209 |
| 7,225,189 B1* | 5/2007 | McCormack et al. | 1/1 |
| 7,231,593 B1* | 6/2007 | Raja et al. | 715/210 |
| 7,529,784 B2* | 5/2009 | Kavuri et al. | 1/1 |
| 7,539,724 B1* | 5/2009 | Callaghan | 709/205 |
| 7,664,804 B2* | 2/2010 | Battagin et al. | 707/804 |

OTHER PUBLICATIONS

Falkner-M. "Tame Spreadsheet Spread! (Tips on Linking Spreadsheets)", 1990, 7 pages.*

European Search Report for Application No. 06837657, European Patent Office, dated Mar. 22, 2011.

* cited by examiner

US 8,050,784 B2

INTEGRATED PROGRAMMER REFERENCE FOR INDUSTRIAL CONTROL DEVICE DATA

CROSS-REFERENCE TO RELATED APPLICATIONS

This application claims the benefit of U.S. Provisional 60/736,701 filed Nov. 15, 2005 and U.S. Provisional 60/737,438 filed Nov. 16, 2005, hereby incorporated by reference.

STATEMENT REGARDING FEDERALLY SPONSORED RESEARCH OR DEVELOPMENT

BACKGROUND OF THE INVENTION

The present invention relates to industrial controllers for controlling equipment and processes, and in particular to a computer program for use in programming industrial controllers.

Industrial controllers are specialized electronic computers providing high reliability operation and real-time control within well-characterized performance standards. The industrial controllers are normally tailored to a particular application by combining a number of standard components such as a central controller, a network, and input/output (I/O) modules.

The control programs executed by an industrial controller, unlike standard applications executed on conventional computers, are often unique to a particular installation, reflecting the particular requirements of the equipment and machinery subject to control, and the selected components of the industrial controller. For this reason, it is important that the task of writing programs for the industrial controller be simple and efficient, and that the user of the industrial controller be provided with effective tools to write and maintain the specialized control programs.

Many of the variables used in a control program are data from sensors or to actuators communicating with the controlled process or equipment. This data can be identified numerically, for example, as related to an I/O connection point or terminal on the industrial controller. More typically, however, program development programs for control programs allow the programmer to select variable names, or "tags" chosen for mnemonic purposes.

Identifying and naming a large number of input and output variables and linking them to industrial controller components can be quite difficult. For this reason, it is known to provide a program development program that can provide the programmer with information about the types of data provided by the principal hardware components of an industrial controller. As new devices are added, the program development program is updated so that the programmer is always provided with a reference to the types of data available from each component and the meaning of that data. The programmer can use this reference to properly identify variables needed in the program being developed.

A drop in computing costs has caused an increase in low-level devices, such as sensor and actuators, that provide multi-bit data transfers with an industrial controller. Unlike the principle hardware components of the industrial controller, such low-level devices may be manufactured by a large number of different companies and be subject to a much greater variety of function and rates of change of specification. Accordingly, information about the meaning and function of the data from such devices is not easily incorporated into the program development program.

SUMMARY OF THE INVENTION

The present invention provides a computer program that extracts descriptions of device data from electronic data sheets that may be prepared by a device vendor as part of an open standard. Using mappings associating data of a particular device to specific memory locations in the controller, descriptions of device data from electronic data sheets are linked to the addresses of those memory locations to create a programmer reference available to the programmer during programming. In this way, the rapid change in device characteristics may be accommodated through a distributed open source collaboration, and the programmer is freed from the requirement of referring to a variety of written materials from multiple manufacturers in order to create a control program or modify a control program communicating with such devices.

More specifically, the present invention provides a computer program producing a program variable reference for programming an industrial controller, where the industrial controller communicates with a variety of devices for the control of an industrial process. The computer program of the invention includes a parser for reading electronic data sheets associated with the devices to extract a description of the function of the data and a data type of the data exchanged between the industrial controller and the device. A mapper creates a map relating the device data of a device communicating with the industrial controller to a location in a memory of the industrial controller. A reference generator, receiving data from the parser and the mapper, then creates a programmer's reference connecting variable names of device data, used in a control program, to corresponding: (i) locations in a memory of the industrial controller where the device data is stored; (ii) devices of the device data; (iii) functional descriptions of the device data; and (iv) data type of the device data.

It is thus one feature of at least one embodiment of the invention to provide a tool to assist the programmer of an industrial control program in writing programs that use data from a variety of control devices having differing and changing standards.

The mapper may also use the data types extracted from the electronic data sheets to perform the mapping.

It is thus one feature of at least one embodiment of the invention to provide for improved mapping of device data to variables in memory by providing advanced knowledge of data types.

The reference generator may further embed the programmer's reference into source code of the control program accessible by a programmer modifying the control program.

It is thus one feature of at least one embodiment of the invention to ensure the programmer's reference is available to later programmers so that they can obtain the benefits of the present invention when modifying the control program.

The variable names include human readable text selected by the programmer.

It is thus one feature of at least one embodiment of the invention to provide a system that allows the programmer the greatest possible flexibility in creating descriptive variable names.

The electronic data sheets further include configuration information for the devices and wherein the reference generator further inserts the configuration information into the source code.

It is thus one feature of at least one embodiment of the invention to simplify the task of the programmer in configuring a variety of devices from different manufacturers and of different designs.

The devices may be input/output devices.

It is thus one feature of at least one embodiment of the invention to create a system for low-level devices where compact transmission of unformatted data may occur.

The mapper may output a tree structure showing relationships among the variables and the devices of the industrial control system.

It is thus one feature of at least one embodiment of the invention to provide the programmer with an overview of the device organization and the structure of the control system during programming.

The mapper may provide a proposed variable name based on the relationships embodied in the tree structure.

It is thus one feature of at least one embodiment of the invention to promote variable names that reveal the structure of the industrial controller.

These particular objects and advantages may apply to only some embodiments falling within the claims, and thus do not define the scope of the invention.

DETAILED DESCRIPTION OF THE PREFERRED EMBODIMENT

Figure 1:
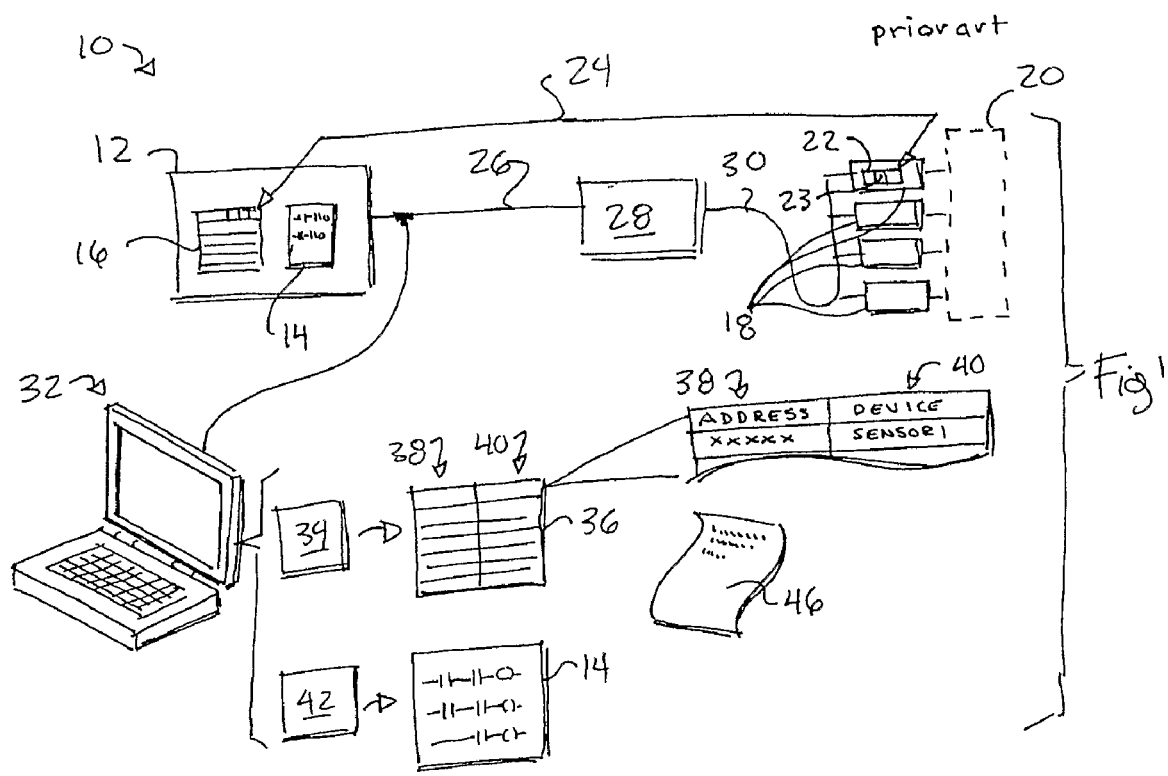
FIG. 1 is a block diagram of an industrial control system showing the operation of a prior art program development program and network program, allowing a programmer to develop a control program and map data of an I/O device to the memory of the controller while referring to written documentation from a manufacturer of the I/O device.

Referring now to FIG. 1, an industrial control system 10 may include a central controller 12, for example, the Logix5000 controller commercially available from Rockwell Automation Inc., the assignee of the present invention. During operation, the central controller 12 may execute a stored control program 14 to read and write data from a data table 16 holding internal variables and external variables, the latter representing input and output data exchanged to and from a series of devices 18 sensing data from or controlling actuators associated with a controlled process 20.

Device data 22, held within the devices 18, updates the data of the data table 16 (and vice versa) during a scanning process, in which particular device data 22 maps to particular address ranges in the data table 16 as indicated by arrow 24. The exchange of data is accomplished through a control-level network 26 such as ControlNet or Ethernet/IP, and, for example, through a bridge 28 with a device-level network 30 such as DeviceNet, the latter communicating with the devices 18.

As part of the development of a particular industrial control system 10, a programming terminal 32 (such as a standard desktop or laptop computer) may be connected to the industrial control system 10 to configure the scanning process and develop the control program 14. The scanning process may be configured using a network program 34 (such as RSNetWorx, commercially available from Rockwell Automation, Inc.) running on the programming terminal 32. In this configuration process, the programmer identifies device data 22 for each device 18, and provides a unique address within data table 16 where that data will be stored.

The network program 34 creates a data map 36 that provides a logical first column identifying a starting address 38 in the data table 16, and a logical second column linking each starting address 38 to a device identifier 40 of a specific device 18 using that starting address 38 for data exchange. The function of individual data elements 23 within the device data 22 for a particular device 18 is not described in the data map 36.

Programming terminal 32 may likewise execute a program development program 42 (such as RSLogix, commercially available from Rockwell Automation, Inc.) that may be used to develop the control program 14. The control program 14 is here depicted as a ladder-logic program but may be written in any of a variety of well-known control program languages.

During the development of the control program 14 using the program development program 42, the programmer may create and name input and output variables corresponding to particular data elements 23 of the device data 22 in the devices 18. In this process, variable names or "tags" are associated with addresses in the data table 16.

Creating descriptive tags requires that the function and source (or destination) of the data held in the data table 16 be accurately identified to particular data elements 23 in the devices 18. The device 18 associated with given data in the data table 16 may be determined from the data map 36, which links a starting address in the data table 16 to given devices 18, but referencing the data map 36 is time-consuming and error prone. Further, the offset from the starting address for data associated with a particular data element 23 is not revealed by the data map 36.

For this offset information, the programmer must typically consult device manuals 46 from the manufacturer of the particular device 18 which provide not only the offset of each data element 23, but also the function or purpose of that data element 23, useful in creating the tag. Thus, for example, a proximity switch may provide for eight bits of input data (the device data 22) with the third bit (a data element 23) indicating whether the switch has been tripped. Knowing this information allows naming the data element 23 as held in the data table 16 (e.g. SwitchTripped) but determining this offset using manual records is cumbersome at best.

Figure 2:
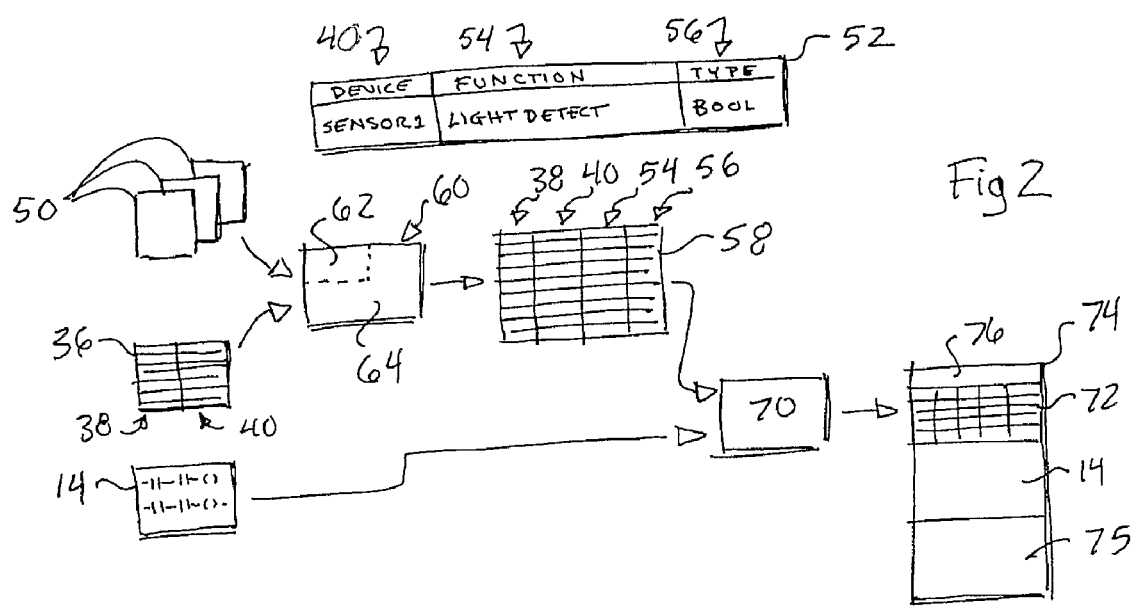
FIG. 2 is figure similar to that of FIG. 1 showing a first embodiment of the invention further employing a parser and mapping programs to extract data from a set of electronic data sheets to augment a data map developed by the programs of FIG. 1, and further showing a reference generator receiving the augmented data map and the control program to incorporate a programmer reference into the source code of the control program for ready access by the programmer.

Referring now to FIG. 2, the present invention contemplates development of a series of supplemented electronic data sheets 50 by each manufacturer of the devices 18. Basic electronic data sheets 50 currently exist for many devices 18 according to an open standard known to those of ordinary skill in the art and provide configuration data for the devices 18. The supplemented electronic data sheets 50 include this basic information, together with supplemental data 52, providing (1) a device identifier 40, (2) a functional description 54 of each data element 23, and (3) a data type 56 of each data element 23, for all device data 22 identified to the particular device 18. The data type 56 may be a standard data type such as Boolean, single integer, and double integer, etc.

The data map 36 and the supplemented electronic data sheets 50 are then combined by an augmenting program 60 to produce an augmented data map 58. The augmenting program 60 has a parser 62 extracting the functional descriptions 54 and data types 56 for each device 18, and a mapper 64 connecting these functional descriptions 54 and data types 56 to the starting addresses 38 of the data map 36. This connection process may be done by matching device identifiers 40 of the data map 36 and the supplemented electronic data sheets 50. The augmented data map 58 provides addresses for all data elements 23 in data table 16 and descriptions of the types of data and functions of the data elements 23.

The augmented data map 58 and the control program 14 are then used by a reference generator 70 to create an augmented control program 74. Importantly, the augmented control program 74 provides reference information 72, holding for each mapped tag name or variable used in the control program 14: (1) a starting address 38 and offset in the data table 16 associated with the data element 23 referred to by that tag name or variable, (2) a device identifier 40 for the device 18 associated with the data element 23 referred to by that tag name or variable, and (3) a functional description 54 and data type 56 of the data element 23 referred to by that tag name or variable.

The augmented control program 74 also holds the control program 14 itself, configuration data 76 used to configure the devices 18 and central controller 12, and linking instructions 75 that will be used to connect the defined program variables to the data table 16 during operation. The configuration data 76 may also be extracted by the parser 62 from the supplemented electronic data sheets 50.

Reference information 72 may not necessarily be human-readable within the source code, but may be interpreted by a program development program 42 to provide a reference to the programmer for this type of data.

Figure 3:
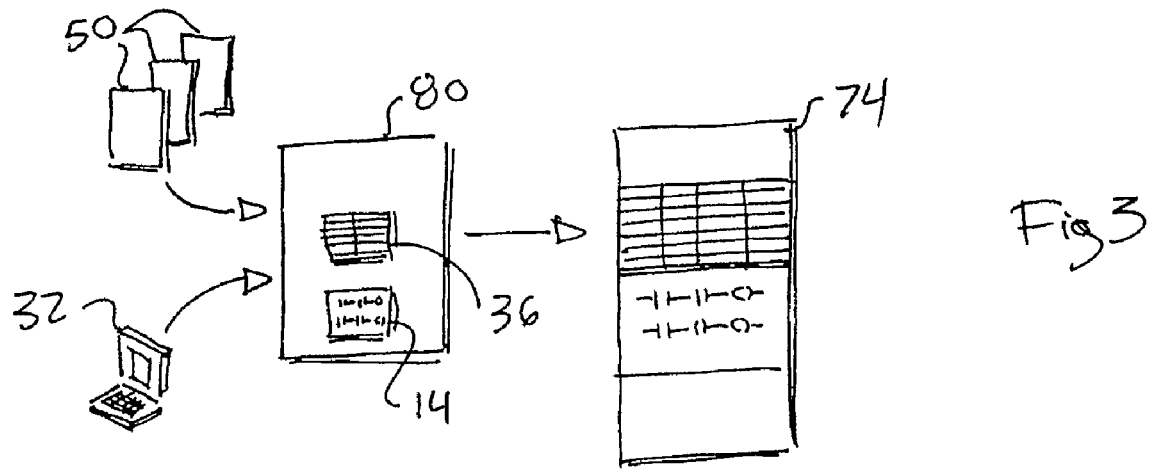
FIG. 3 is a figure similar to that of FIG. 2, showing a second embodiment in which the parser, mapper, and reference generator are incorporated into an integrated program development environment.
Figure 4:
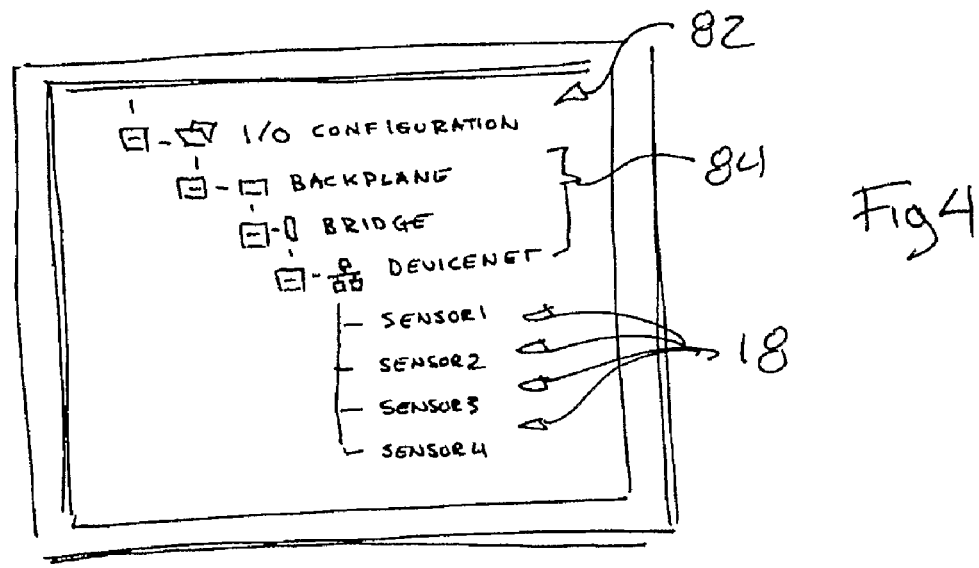
FIG. 4 is a screen display produced by the integrated program development environment of FIG. 3 showing a graphic interface for creating a programmer reference per the present invention.

Referring now to FIG. 3, it will be understood that the parser 62, mapper 64, and reference generator 70 may be incorporated with the program development program 42 and network program 34 to create an integrated development environment 80 that may receive supplemented electronic data sheets 50, and programming and mapping instructions from the programming terminal 32 to create an internal control program 14 and data map 36, and to directly produce augmented control program 74.

In this development process, the integrated network program 34 may operate together with the program development program 42 to provide the programmer with a graphic interface 82 allowing the programmer to build a visual hierarchy showing each of the devices 18, together with higher-level interconnecting devices 84 that form the network. Using an interactive menu structure, the programmer, while developing the control program, may identify each component and device 18 and name the particular devices 18 to provide the device identifiers (e.g., Sensor1, Sensor2 etc.) and the particular supplemented electronic data sheet 50 for that device.

In this case, the reference generator 70 may help the programmer create mnemonically efficient tags by appending the functional description 54 and selected device identifier 40 onto a model tag name. For example, a data element 23 providing a "light detection" function for an optical proximity switch identified by the user as "Sensor1", produces a tag name of "Sensor1.LightDetect".

It is specifically intended that the present invention not be limited to the embodiments and illustrations contained herein, but include modified forms of those embodiments including portions of the embodiments and combinations of elements of different embodiments as come within the scope of the following claims.

We claim:

1. A computer program providing a program variable reference for programming an industrial controller, the industrial controller executing a control program configured to communicate with a variety of devices and to control an industrial process, the computer program comprising:
    (a) a parser for reading an electronic data sheet containing a plurality of data associated with at least one of the devices, the data including a device identifier, a description of a function of the data, and a data type of the data, the parser extracting from the electronic data sheet the description and the data type identified to the device;
    (b) a mapper reading a memory map corresponding to the control program, the memory map including a plurality of starting addresses and a plurality of device identifiers corresponding to the starting addresses, wherein the mapper relates the device identifier from each data sheet to one of the device identifiers in the memory map; and
    (c) a reference generator receiving data from the parser and the mapper to create a programmer's reference including an augmented memory map further comprising:
        (i) the plurality of starting addresses;
        (ii) the plurality of device identifiers corresponding to the starting addresses; and
        (iii) the description and the data type from each data sheet corresponding to one of the device identifiers.

2. The computer program of claim 1 wherein the reference generator further embeds the programmer's reference into the control program accessible by a programmer modifying the control program.

3. The computer program of claim 1 wherein the device identifiers include human readable text selected by a programmer.

4. The computer program of claim 1 wherein the electronic data sheets further include configuration information for the devices and wherein the reference generator further inserts the configuration information into the control program executed by the industrial controller.

5. The computer program of claim 1 wherein the devices are input/output devices.

6. The computer program of claim 1 further including:
    a program development program for creating the control program and wherein the reference generator further displays the programmer's reference to the programmer while the programmer is using the program development program.

7. The computer program of claim 6 wherein the mapper outputs a tree structure showing relationships among the device data and the devices of the industrial control system.

8. The computer program of claim 7 wherein the mapper provides a proposed variable name based on the relationship of the tree structure.

9. The computer program of claim 1 wherein the parser, mapper and reference generator are independently executable programs.

10. The computer program of claim 1 wherein the parser, mapper and reference generator are an integrated program.

11. A method of generating a program variable reference for programming an industrial controller, the industrial controller executing a control program configured to communicate with a variety of devices and to control an industrial process, the method comprising the steps of:
    (a) reading an electronic data sheet containing a plurality of data associated with at least one of the devices, the data including a device identifier, a description of a function of the data, and a data type of the data, the reading extracting from the electronic data sheet the description and the data type identified to the device;

(b) reading a memory map corresponding to the control program, the memory map including a plurality of starting addresses and a plurality of device identifiers corresponding to the starting addresses, (c) relating the device identifier from each data sheet to one of the device identifiers in the memory map; and (d) creating a programmer's reference including an augmented memory map further comprising:

(i) the plurality of starting addresses;

(ii) the plurality of device identifiers corresponding to the starting addresses; and (iii) the description and the data type from each data sheet corresponding to one of the device identifiers.

12. The method of claim 11 wherein the electronic data sheets have an open source structure and are created by a plurality of different device manufacturers.

13. The method of claim 11 further including the step of embedding the programmer's reference into the control program to be accessible by a programmer modifying the control program.

14. The method of claim 11 wherein the device identifiers include human readable text selected by programmer.

15. The method of claim 11 wherein the electronic data sheets further include configuration information for the devices and including the step of inserting the configuration information into the control program executed by the industrial controller.

16. The method of claim 11 further including the step of receiving programmer input to create the control program while displaying the programmer's reference to programmer for use in writing the control program.

17. The method of claim 16 including the step of outputting a tree structure showing relationships among the data elements and the devices of the industrial control system.

18. The method of claim 17 including the step of generating a proposed variable name for a variable based on the relationship of the tree structure.

* * * * *